United States Patent
Fassbender et al.

(10) Patent No.: US 12,424,696 B2
(45) Date of Patent: Sep. 23, 2025

(54) CONVERTIBLE BATTERY PACK

(71) Applicant: MILWAUKEE ELECTRIC TOOL CORPORATION, Brookfield, WI (US)

(72) Inventors: Kyle C. Fassbender, Brookfield, WI (US); Ryan B. Jipp, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 629 days.

(21) Appl. No.: 17/849,495

(22) Filed: Jun. 24, 2022

(65) Prior Publication Data

US 2022/0416355 A1 Dec. 29, 2022

Related U.S. Application Data

(60) Provisional application No. 63/214,972, filed on Jun. 25, 2021.

(51) Int. Cl.
*H01M 50/269* (2021.01)
*H01M 50/213* (2021.01)
*H01M 50/284* (2021.01)

(52) U.S. Cl.
CPC ....... *H01M 50/269* (2021.01); *H01M 50/213* (2021.01); *H01M 50/284* (2021.01)

(58) Field of Classification Search
None
See application file for complete search history.

(56) References Cited

U.S. PATENT DOCUMENTS

| | | |
|---|---|---|
| 2009/0031865 A1 | 2/2009 | Alberti et al. |
| 2011/0266014 A1 | 11/2011 | McRoberts et al. |
| 2013/0083496 A1* | 4/2013 | Franklin ............. H01M 50/293 361/752 |
| 2015/0357692 A1* | 12/2015 | Piggott ................ H02J 7/0068 29/623.2 |
| 2015/0380697 A1 | 12/2015 | Osborne et al. |
| 2018/0099396 A1 | 4/2018 | Tida et al. |
| 2018/0105062 A1 | 4/2018 | Fees et al. |
| 2018/0218429 A1* | 8/2018 | Guo ....................... G06N 3/045 |

OTHER PUBLICATIONS

International Search Report and Written Opinion for Application No. PCT/US2022/035005 dated Oct. 21, 2022 (11 pages).
FyreWrap, "FyreWrap® LiB Films," Product Information Sheet © 2019 (1 page).

* cited by examiner

*Primary Examiner* — Wyatt P McConnell
(74) *Attorney, Agent, or Firm* — Michael Best & Friedrich LLP

(57) ABSTRACT

A battery pack including a first battery cell and a second battery cell. The first battery cell is received at least partially within a primary cell casing and extends along a first axis. The second battery cell is received at least partially within an auxiliary cell casing extending along a second axis, the second battery cell being movable relative to the first battery cell.

17 Claims, 11 Drawing Sheets

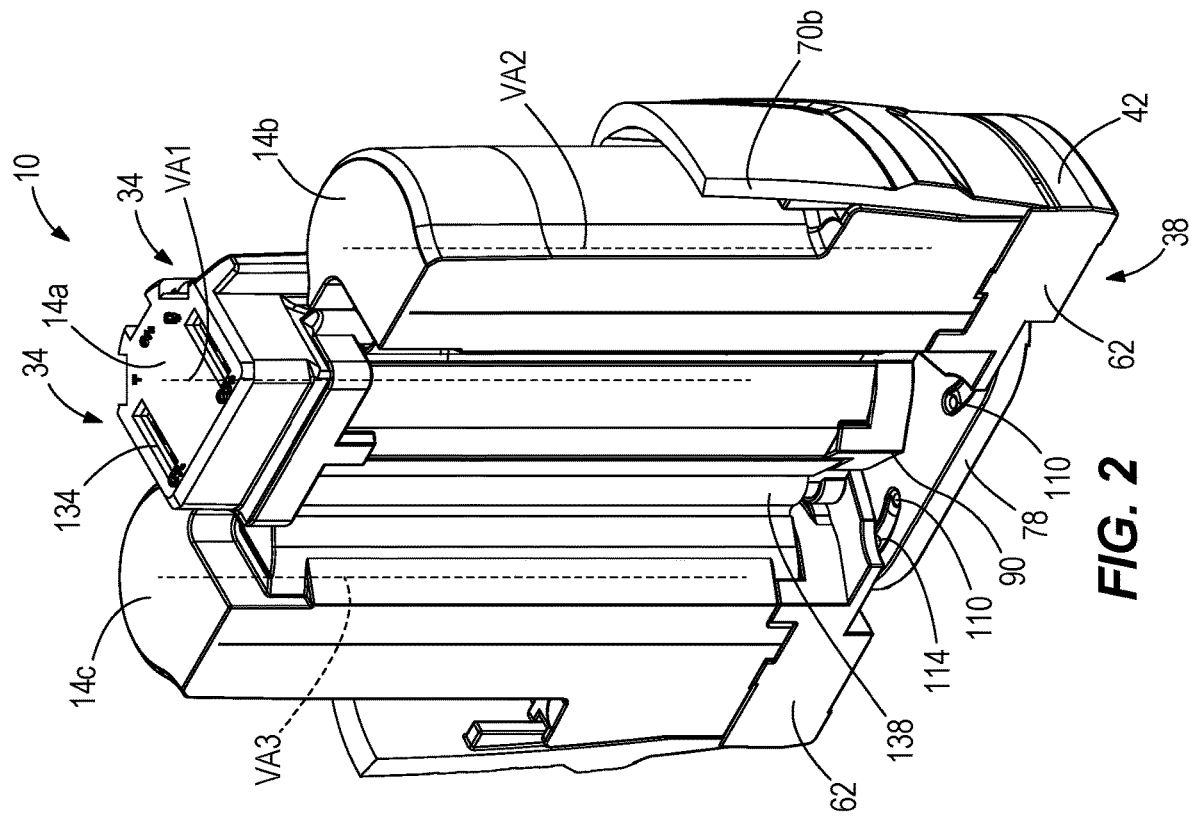
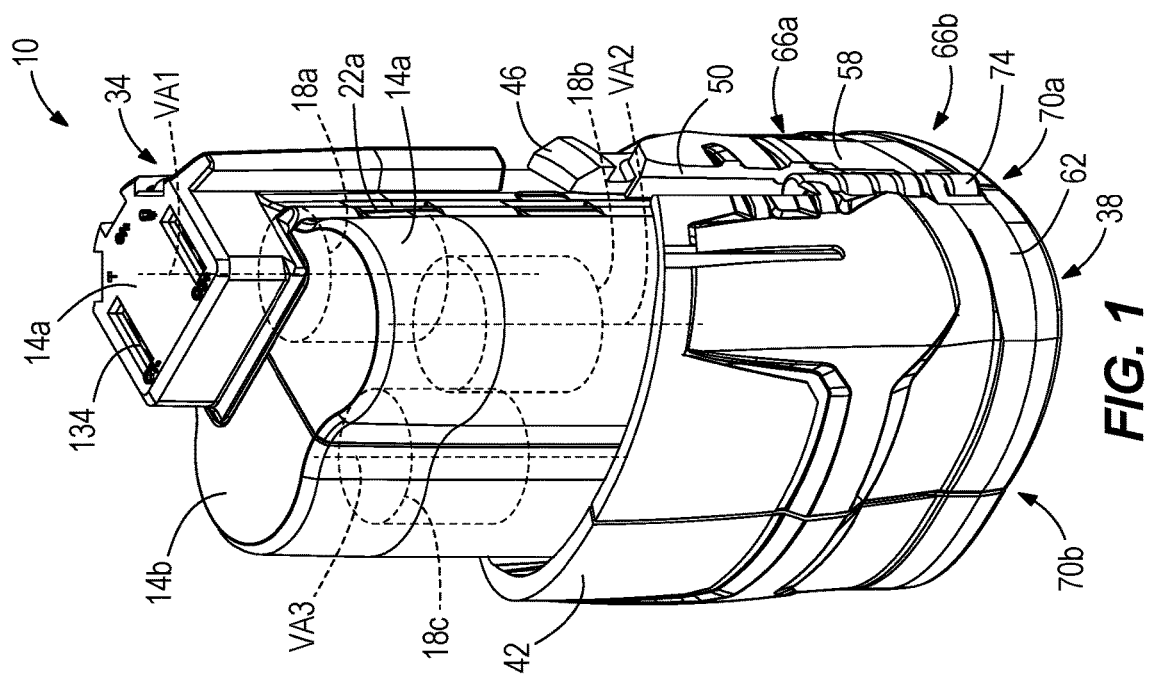

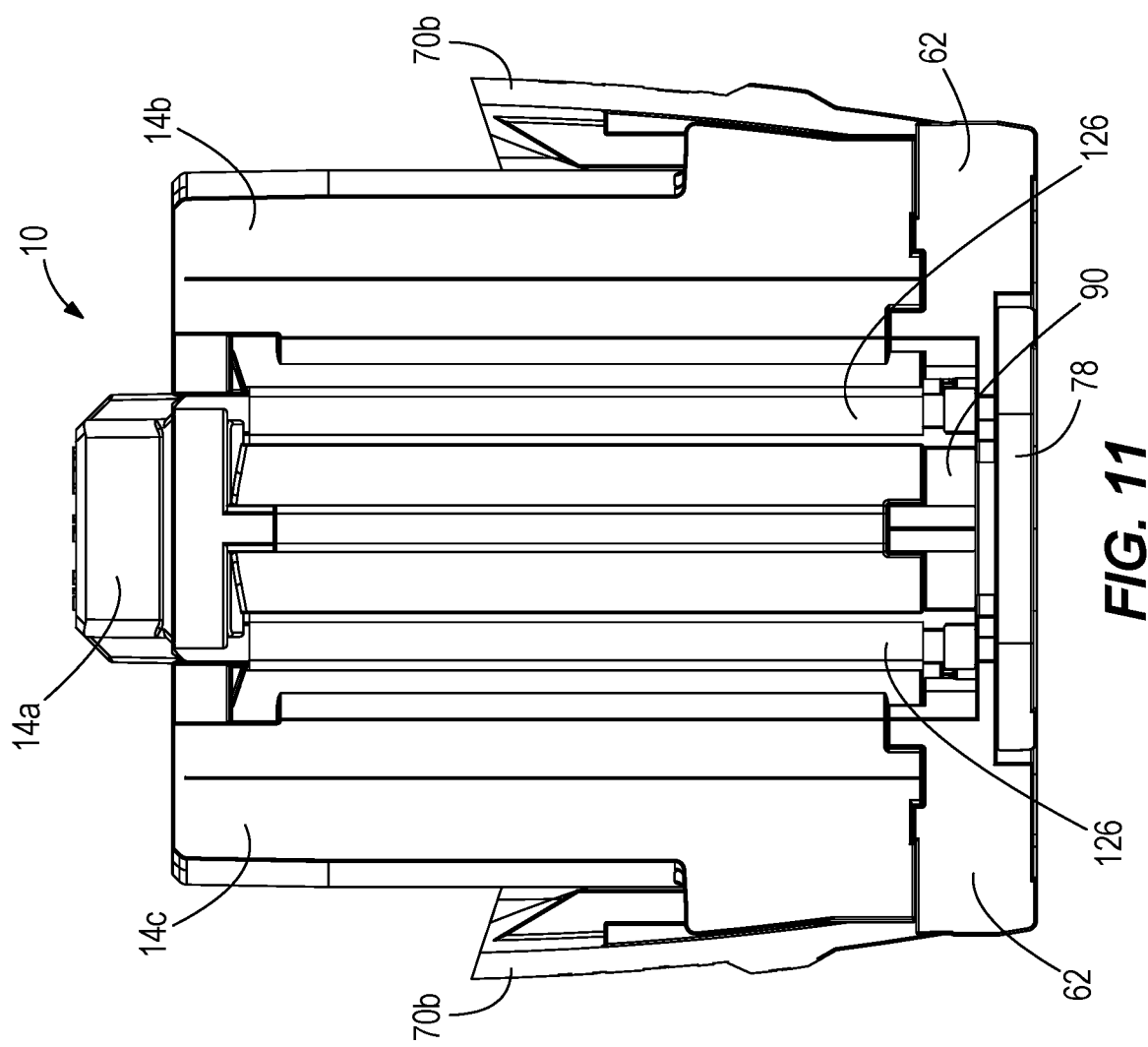
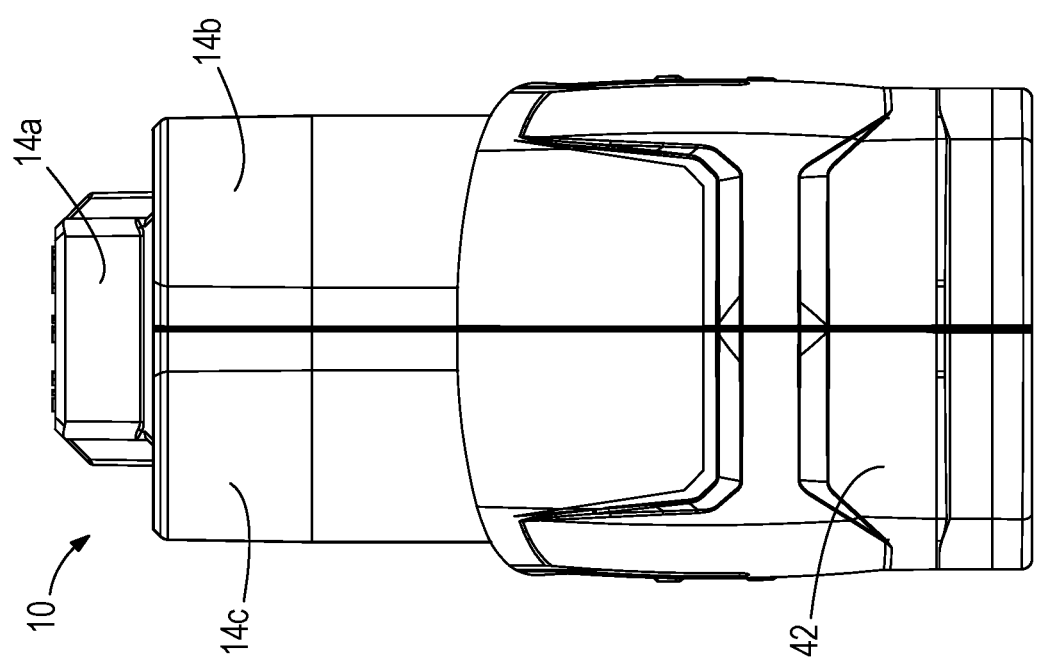

CONVERTIBLE BATTERY PACK

CROSS-REFERENCE TO RELATED APPLICATION

This application claims priority to U.S. Provisional Application No. 63/214,972, filed Jun. 25, 2021, the entire contents of which are incorporated by reference herein.

FIELD OF THE INVENTION

The present invention relates to battery packs, and more particularly to foldable battery packs.

BACKGROUND OF THE INVENTION

Battery packs include battery cells which are typically fixed within a canister housing of a battery pack. Conventional battery packs are not convertible between different configurations.

SUMMARY

In one independent aspect, a battery pack including a first battery cell and a second battery cell. The first battery cell is received at least partially within a primary cell casing and extends along a first axis. The second battery cell is received at least partially within an auxiliary cell casing extending along a second axis, the second battery cell being movable relative to the first battery cell.

In another independent aspect, a battery pack including a first battery cell, at least one second battery cell, a hinge, and a flexible circuit. The first battery cell is received at least partially within a primary cell casing and extends along a first axis. The at least one second battery cell is received at least partially within at least one auxiliary cell casing extending along a second axis parallel to the first axis. The hinge rotatable couples the primary cell casing to the auxiliary cell casing such that the battery pack is convertible between a first configuration and a second configuration. The flexible circuit electrically couples the first battery cell to the second battery cell. The flexible circuit includes a first portion coupled to the first battery cell and a second portion coupled to the second battery cell.

In another independent aspect, a battery pack including a first battery cell, at least one second battery cell, a hinge, and an outer housing. The first battery cell is received at least partially within a primary cell casing and extends along a first axis. The at least one second battery cell is received at least partially within at least one auxiliary cell casing extending along a second is parallel to the first axis. The hinge rotatably couples the primary cell casing to the auxiliary cell casing such that the battery pack is convertible between a first configuration and a second configuration. The outer housing surrounds at least a portion of the primary cell casing and at least a portion o the auxiliary cell casing. The outer housing includes a sliding cam assembly to move the outer housing between the first configuration and the second configuration.

BRIEF DESCRIPTION OF THE DRAWINGS

FIG. 1 is a front perspective view of a battery pack in a first configuration.

FIG. 2 is a front perspective view of the battery pack of FIG. 1 in a second configuration.

FIG. 10 is a front elevation view of the battery pack in a first configuration.

FIG. 11 is a front elevation view of the battery pack in the second configuration.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 4:
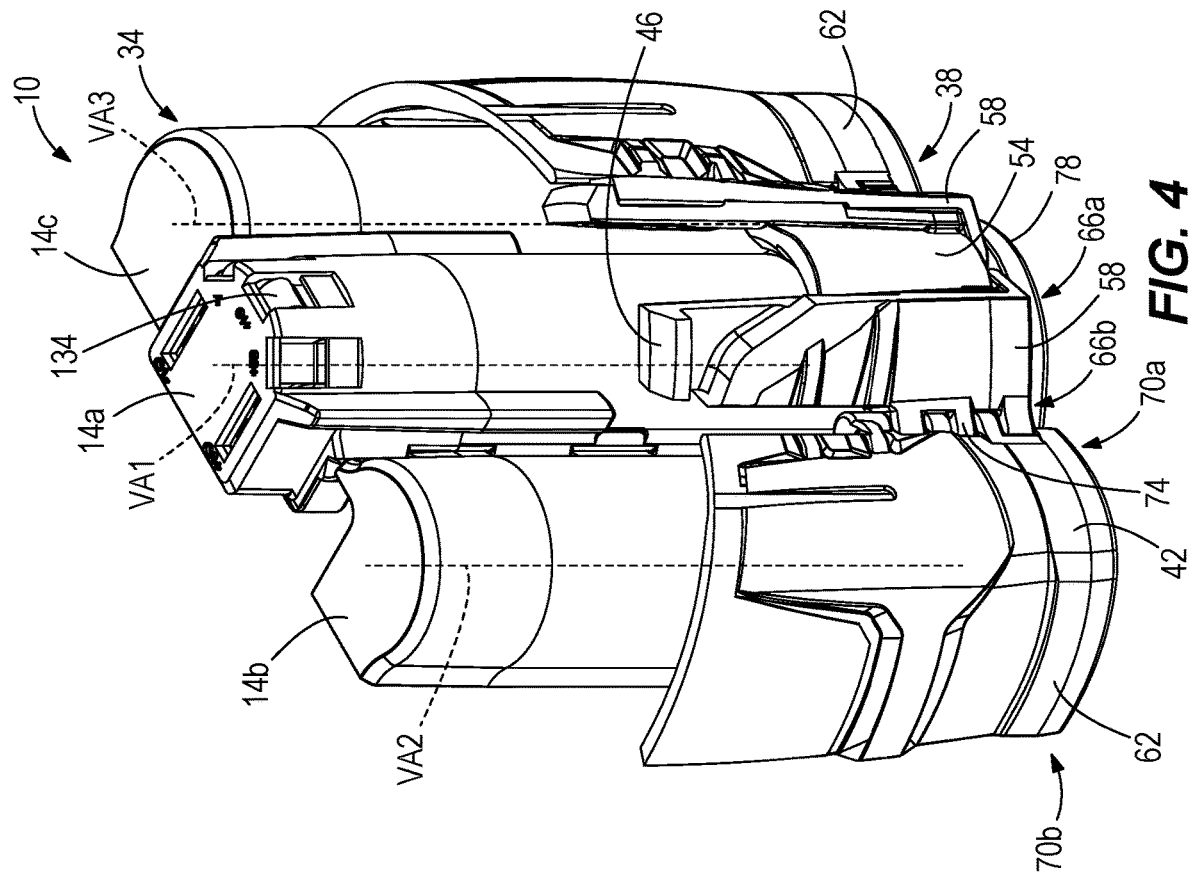
FIG. 4 is a rear perspective view of the battery pack of FIG. 1 in the second configuration.

As shown in FIGS. 1-4, a foldable (i.e., convertible) battery pack 10 is provided. The battery pack 10 includes a primary cell casing 14a within which a first battery cell 18a (also shown in FIG. 12 and discussed below) is housed. The illustrated battery pack 10 further includes two auxiliary cell casings 14b, 14c within which a second battery cell 18b and a third battery cell 18c are housed, respectively. Hinges 22a, 22b rotatably connect the primary cell casing 14a to the auxiliary cell casings 14b, 14c to permit pivoting motion of the auxiliary cell casings 14b, 14c relative to the primary cell casing 14a between a closed position (e.g., a first configuration) (FIGS. 1, 3) and an open position (e.g., a second configuration) (FIGS. 2, 4). As will be described with respect to FIGS. 5 and 6, transitioning the battery pack 10 between the closed position and the open position adjusts an outer peripheral profile 26 of the battery pack 10. The foldable battery pack 10 is provided as a generally prismatic shape. In the closed position, the outer peripheral profile 26 corresponds with a prism having a generally triangular (e.g., a rounded triangular) profile. In contrast, in the open position, the outer peripheral profile 26 corresponds with prism having a generally rectangular profile or a generally semi-circular profile. The outer peripheral profile 26 is made slimmer by transitioning the battery pack 10 to the open position.

Figure 17:
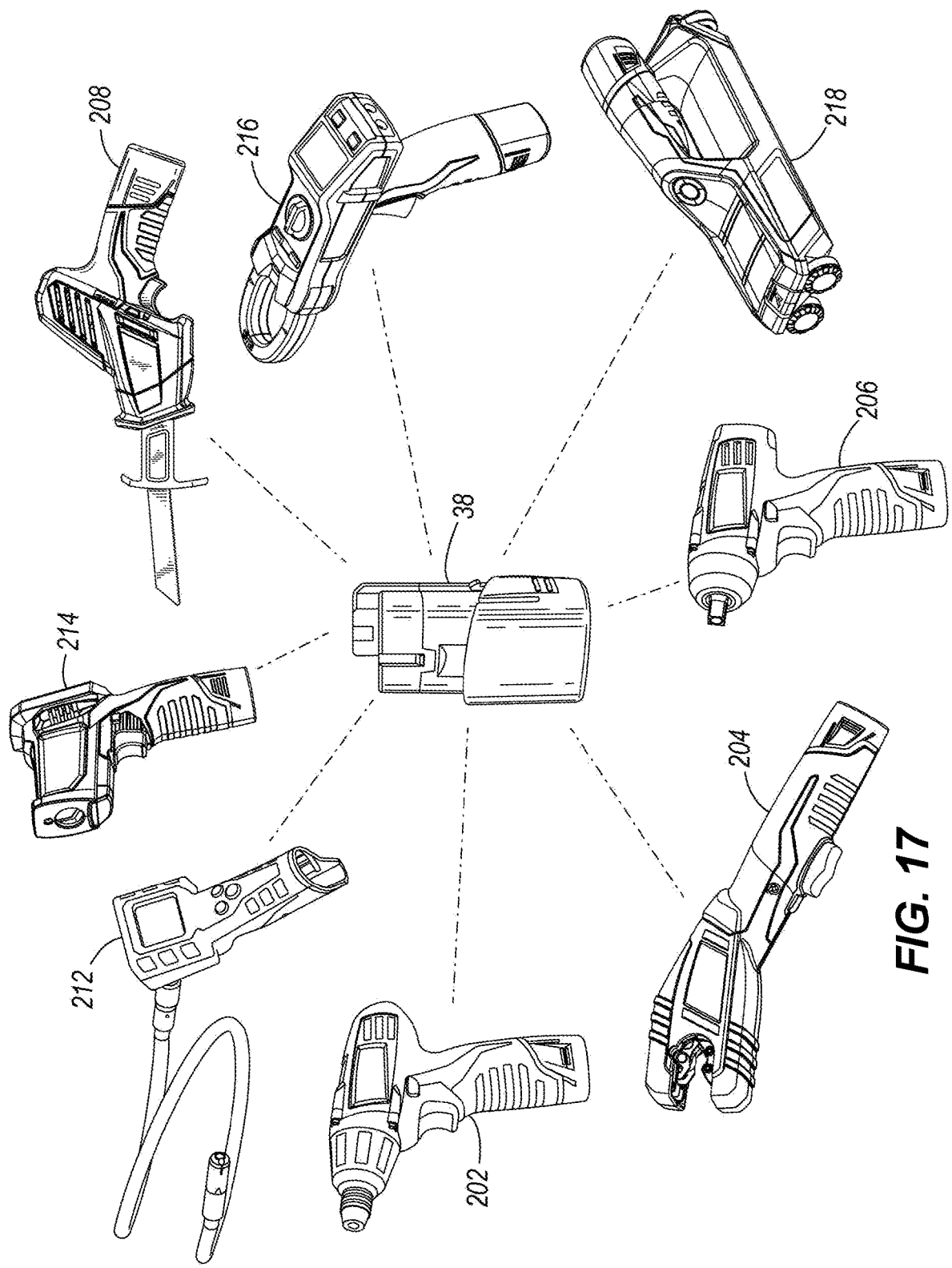
FIG. 17 is a perspective view of the battery pack engaged with various tools.

The battery pack 10 is a lithium-based, rechargeable battery pack 10. The battery pack 10 is removably and interchangeably connected to a battery holder 30 of a tool 202-212 (FIG. 17). The battery pack 10 is configured to provide power to the tool 202-212 for appropriate operation of the tool 202-212. The battery pack 10 is operable to transition (i.e., convert) between the closed position and the open position to accommodate the tool 202-212. The battery pack 10 is engageable with the tool 202-212 without an adapter for either the battery pack 10 or the tool 202-212. In one example (FIG. 18), the battery pack 10 is connected to a battery holder 30 of, for example, a heated jacket 300. The heated jacket 300 includes a compartment 304 that receives the electrically communicative battery pack 10 and battery holder 30. The compartment 304 is adjacent a user's body during use, and the battery pack 10 and battery holder 30 may contact the user. The battery holder 30 of the heated jacket 300 is shaped to receive the battery pack 10 in the open position.

The battery pack 10 is also operable to be received by a battery holder 30 of a charger (not shown) to facilitate charging of the battery pack 10 when not in use. As the battery pack 10 is movable between the open position and the closed position, the battery holders 30 of the heated jacket 300 and the charger are configured to receive the battery pack 10 in either or both of the open position and the closed position. The battery pack 10 may be received in the charger without an adapter for either the charger or the battery pack 10. In some implementations, the battery pack 10 may engage the charger when the battery pack 10 is in the closed configuration (FIGS. 1, 3), and the battery pack 10 may engage the battery holder 30 of the heated jacket 300 in the open configuration (FIGS. 2, 4). Other implementations are possible. In some implementations, the battery pack 10 may be used with other types of cordless, battery-powered tools or devices 202-212 as discussed below with respect to FIG. 17. The battery pack 10 may be used with other power tools or powered sensing devices not specifically discussed herein.

As shown in FIG. 1, the battery pack 10 includes three battery cells 18a-18c positioned within the battery casings 14a-14c. The battery cells provide operational power (e.g., DC power) to the heated jacket 300 or another device. In the illustrated implementation, the battery cells 18a-18c are arranged in series, and each battery cell 18a-18c has a nominal voltage of approximately four-volts (4.0V), such that the battery pack 10 has a nominal voltage of approximately twelve-volts (12V). The cells 18a-18c also have a capacity rating of approximately 1.4 Ah. In other implementations, the battery pack 38 may include more or fewer battery cells 18a-18c, and the cells 18a-18c can be arranged in series, parallel, or a serial and parallel combination. For example, the battery pack 10 can include a total of six battery cells in a parallel arrangement of two sets of three series-connected cells. The series-parallel combination of battery cells creates a battery pack having a nominal voltage of approximately 12V and a capacity rating of approximately 2.8 Ah. In other implementations, the battery cells 18a-18c may have different nominal voltages, such as, for example, 3.6V, 3.8V, 4.2V, etc., and/or may have different capacity ratings, such as, for example, 1.2 Ah, 1.3 Ah, 2.0 Ah, 2.4 Ah, 2.6 Ah, 3.0 Ah, etc. In other implementations, the battery pack 10 can have a different nominal voltage, such as, for example, 10.8V, 14.4V, etc. In the illustrated implementation, the battery cells 10 are lithium-ion battery cells having a chemistry of, for example, lithium-cobalt (Li—Co), lithium-manganese (Li—Mn), or Li—Mn spinel. In other implementations, the battery cells 18a-18c may have other suitable lithium or lithium-based chemistries. The battery pack 10 may be operable to output a signal indicative of the state-of-charge of the battery pack 10. The battery pack 10 may operate in a certain way in response to the state-of-charge of the battery pack 10.

As illustrated in FIG. 1, each battery cell 18a, 18b, 18c extends along a respective vertical axis VA1, VA2, VA3 of the battery pack 10. The hinges 22a, 22b permit rotation of the auxiliary cell casings 14b, 14c relative to the primary cell casing 14a with rotation about the hinges 22a, 22b and generally parallel with the vertical axes VA1, VA2, VA3. In the illustrated embodiment, the hinges 22a, 22b are piano-type hinges which each include a plurality of knuckles which circumscribe a central pin. Other types of hinges 22a, 22b are possible. Accordingly, the battery cells 18a, 18b, 18c extend generally parallel from each other in the illustrated embodiment. The battery pack 10 includes a top end 34 and an opposite bottom end 38. The vertical axes VA1, VA2, VA3 extend through the top end 34 and the bottom end 38.

As illustrated in FIG. 1, the battery pack 10 includes an outer housing 42 adjacent the bottom end 38. The outer housing 42 surrounds the primary cell casing 14a and at least a portion of each of the auxiliary cell casings 14b, 14c. The outer housing 42 includes latching tabs 46 and resilient actuating portions 50 operable to secure the battery pack 10 to the battery holder 30. The latching tabs 46 are coupled to the resilient actuating portions 50 and are configured for a user to selectively engage and disengage the latching tabs 46 with the battery holder 30. The latching tabs 46 may engage the charger or tool 202-212 when the battery pack 10 is in either the closed position or the open position.

Figure 3:
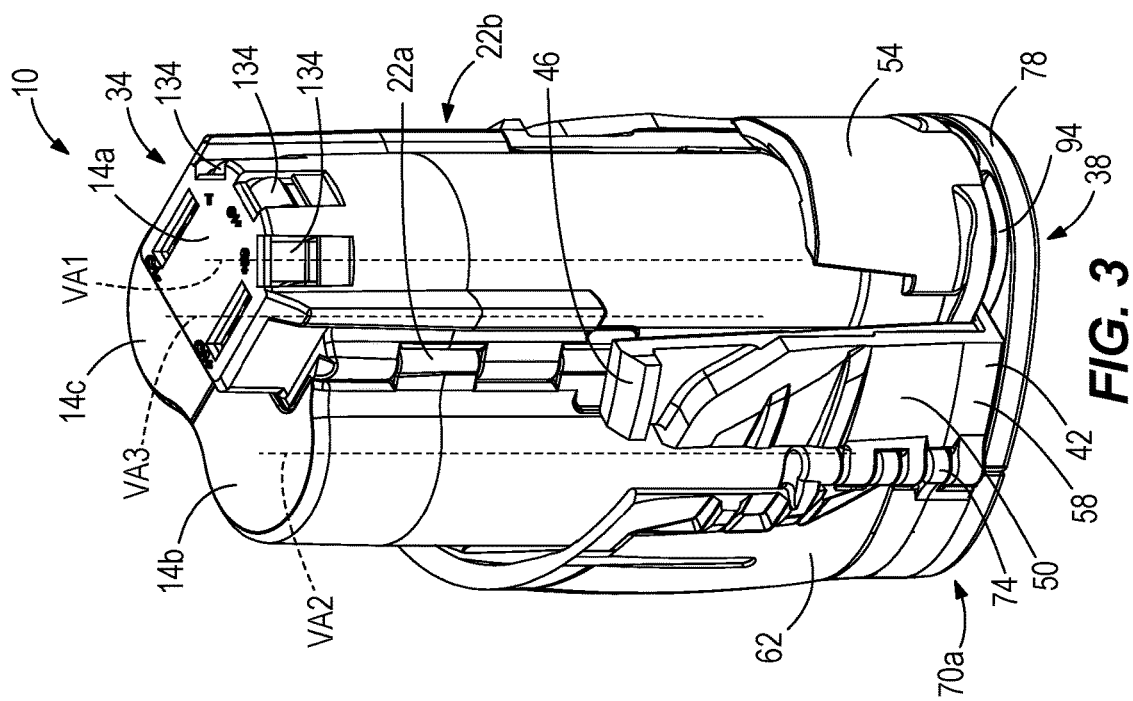
FIG. 3 is a rear perspective view of the battery pack of FIG. 1 in the first configuration.

With reference to FIGS. 3 and 4, the outer housing 42 includes a primary portion 54, a pair of connecting portions 58 (e.g., connectors), and a pair of distal portions 62 (e.g., auxiliary portions). The primary portion 54 is fixed to the primary cell casing 14a. The connecting portions 58 each include a first end 66a coupled to the primary portion 54 and an opposite second end 66b coupled to the distal portions 62. The distal portions 62 each include a first end 70a coupled to the second end 66b of the connecting portions 58 and an opposite tip end 70b. The aforementioned latching tabs 46 and resilient actuating portions 50 are provided with the connecting portions 58. Housing hinges 74 are provided between the second ends 66b and the first ends 70a.

Figure 5:
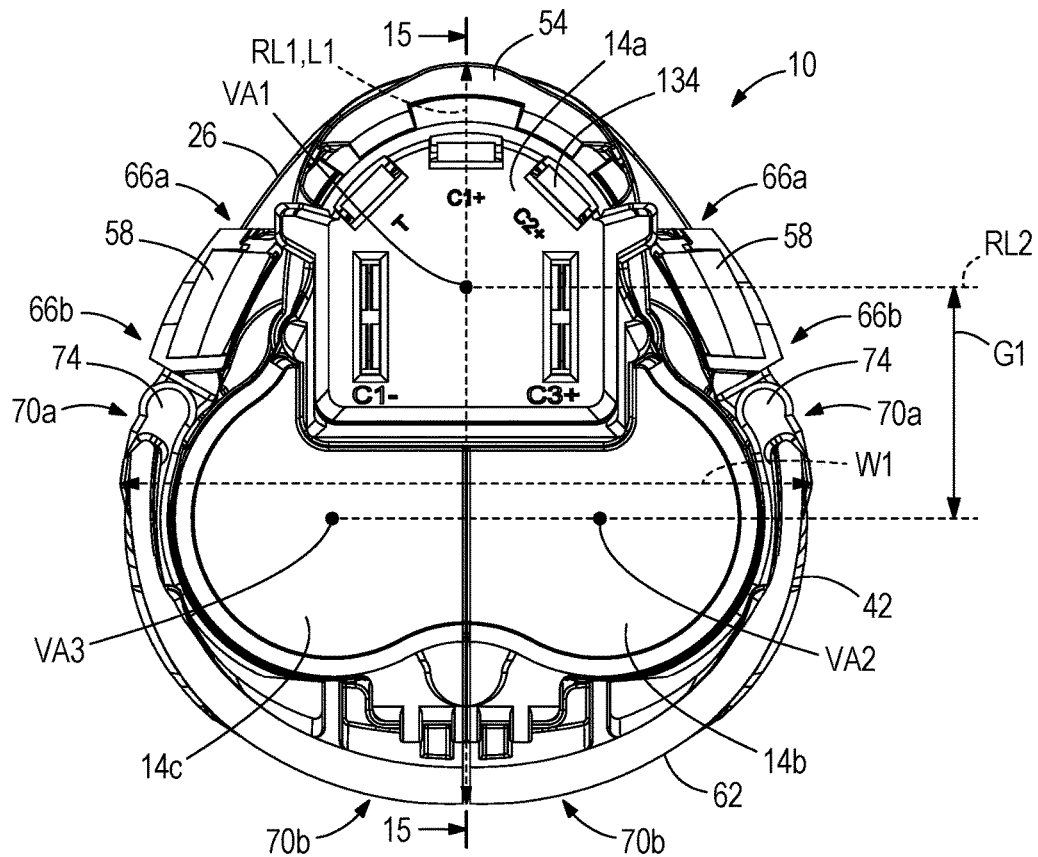
FIG. 5 is a top plan view of the battery pack of FIG. 1 in the first configuration.
Figure 6:
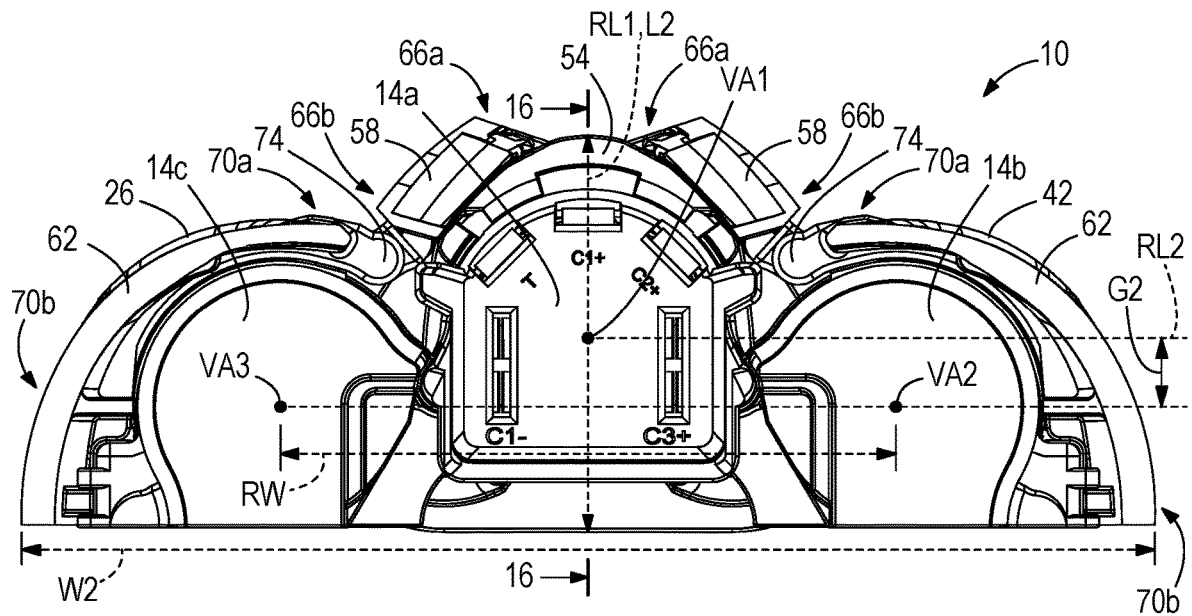
FIG. 6 is a top plan view of the battery pack of FIG. 1 in the second configuration.

FIGS. 5 and 6 illustrate the changes to the outer peripheral profile 26 of the battery pack 10 between the closed position (FIG. 5) and the open position (FIG. 6). A longitudinal reference line RL1 passes through the first vertical axis VA1 orthogonal to the first vertical axis VA1. A lateral reference line RL2 passes through the first vertical axis VA1 orthogonal to both the first vertical axis VA1 and the longitudinal reference line RL1. The aforementioned outer peripheral profile 26 can be seen as a cross-sectional shape of the battery pack 10 taken along a plane defined by the longitudinal reference line RL1 and the lateral reference line RL2.

In the closed position (FIG. 5), the second vertical axis VA2 is located, in a direction parallel to the longitudinal reference line RL1, a first longitudinal gap G1 from the first vertical axis VA1. In the open position (FIG. 6), the second vertical axis VA2 is located, in a direction parallel to the longitudinal reference line RL2, a second longitudinal gap G2 from the first vertical axis VA1. The second gap G2 is less than the first longitudinal gap G1.

With reference to FIG. 5, the outer peripheral profile 26 of the battery pack 10 in the closed position includes a width W1 and a length L1. The length L1 is measured from the exterior of the battery pack 10 parallel to the longitudinal reference line RL1 at a thickest portion of the battery pack 10. The width W1 is measured from the exterior of the battery pack 10 parallel to the lateral reference line RL2 at the thickest portion of the battery pack 10. With reference to FIG. 6, the outer peripheral profile of the battery pack 10 in the open position includes a width W2 and a length L2. The length L2 is measured from the exterior of the battery pack 10 parallel to the longitudinal reference line RL1 at the thickest portion of the battery pack 10. The width W2 is measured from the exterior of the battery pack 10 parallel to the lateral reference line RL2 at the thickest portion of the battery pack 10. In the illustrated embodiment, the length L1 is 51.2 mm and the length L2 is 31.7 mm. In other embodiments, the lengths L1 and L2 may differ from the illustrated embodiment and correspond generally with otherwise sized battery packs. In the illustrated embodiment, the length L2 is approximately 62% of the length L1. In other embodiments, the length L2 may be between 50% and 75% of the length L1. In other embodiments, the length L2 may be between 25% and 99% of the length L1. In other words, the battery pack 10 is thinner in the open configuration when compared to the closed configuration.

Several other comparisons can be made between the outer peripheral profile 26 of the closed position and the open position. For example, the width W2 is larger than the width W1. In the closed position of FIG. 5, the tip ends 70b of the distal portions 62 are located adjacent each other each laterally between the second vertical axis VA2 and the third vertical axis VA3. In the open position of FIG. 6, the tip ends 70b of the distal portions 62 are spaced from each other to define the width W2 of the battery pack, the width W2 being greater than a reference width RW between the second vertical axis VA2 and the third vertical axis VA3 in the direction parallel to the lateral reference line RL2. The width W2 is defined as a lateral width of the battery pack 10.

Figure 7:
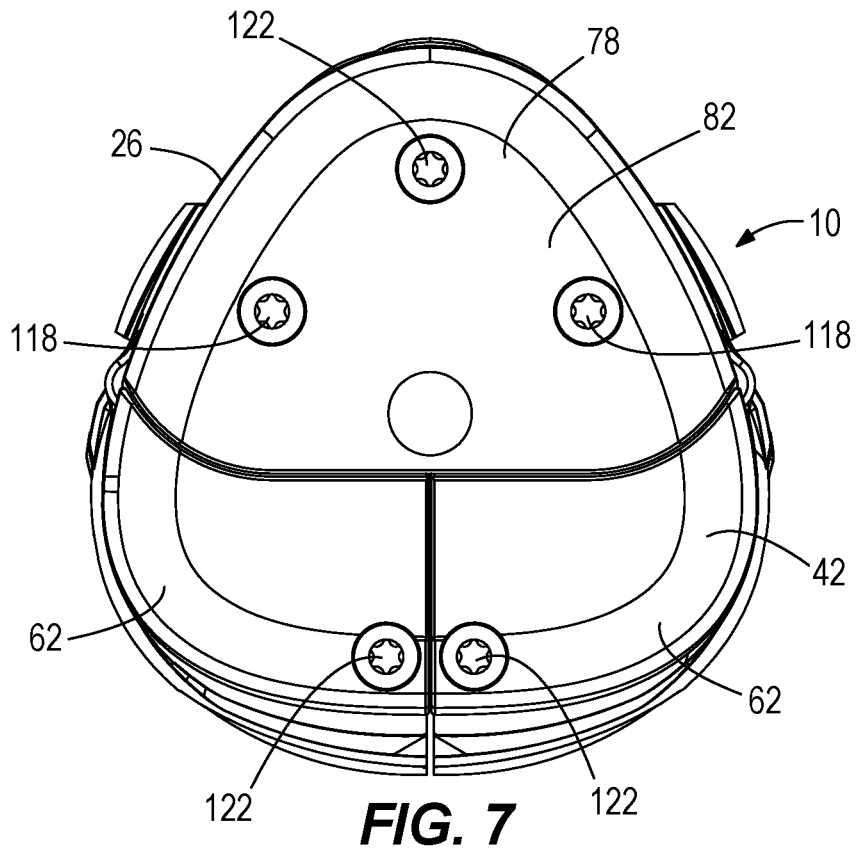
FIG. 7 is a bottom plan view of the battery pack of FIG. 1 in the first configuration.
Figure 7A:
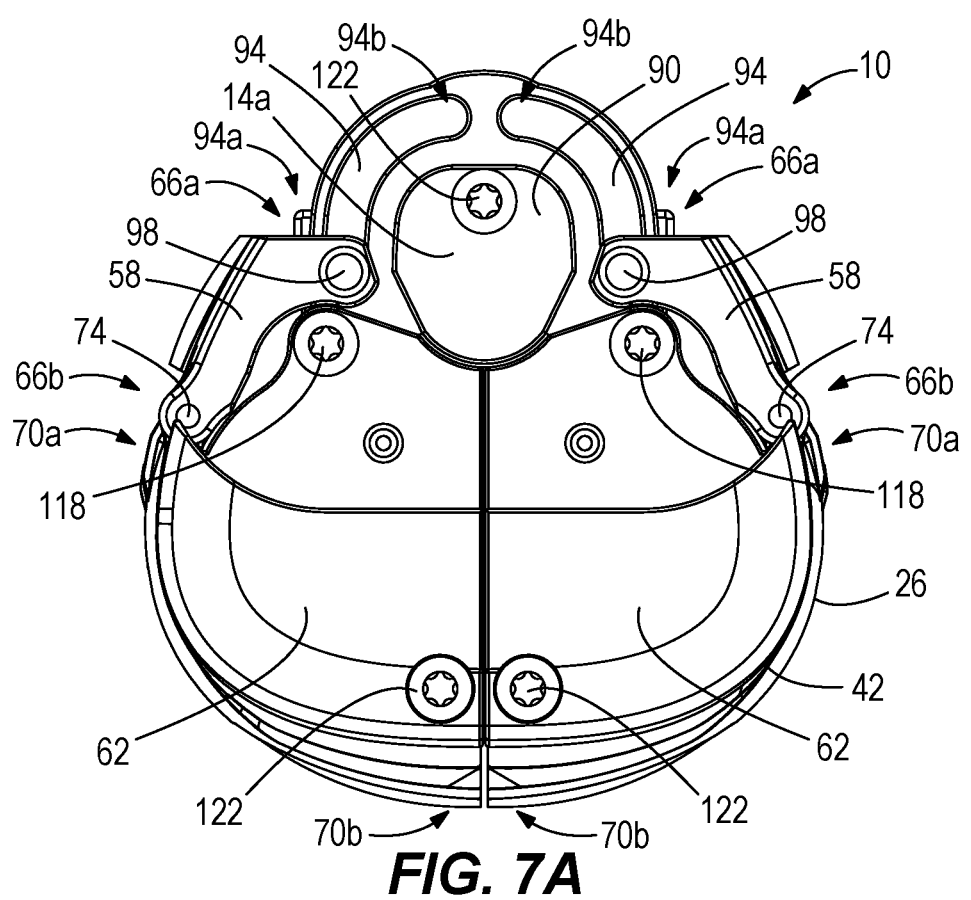
FIG. 7A is a bottom plan view of the battery pack of FIG. 1 in the first configuration with a bottom end cap removed.
Figure 8:
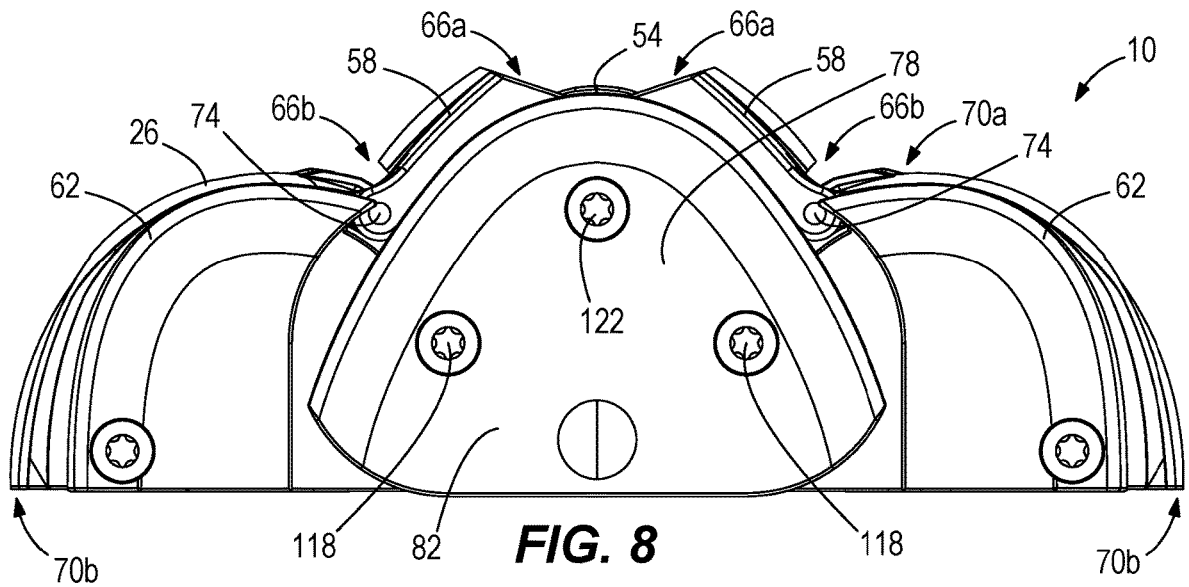
FIG. 8 is a bottom plan view of the battery pack of FIG. 1 in the second configuration.
Figure 8A:
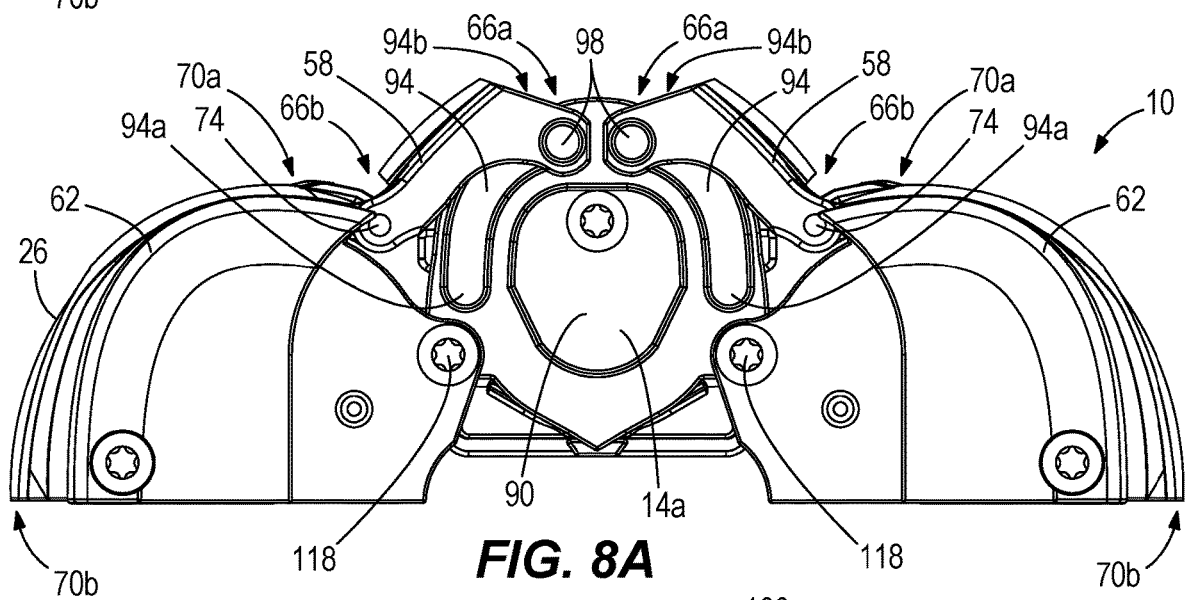
FIG. 8A is a bottom plan view of the battery pack of FIG. 1 in the second configuration with the bottom end cap removed.
Figure 9:
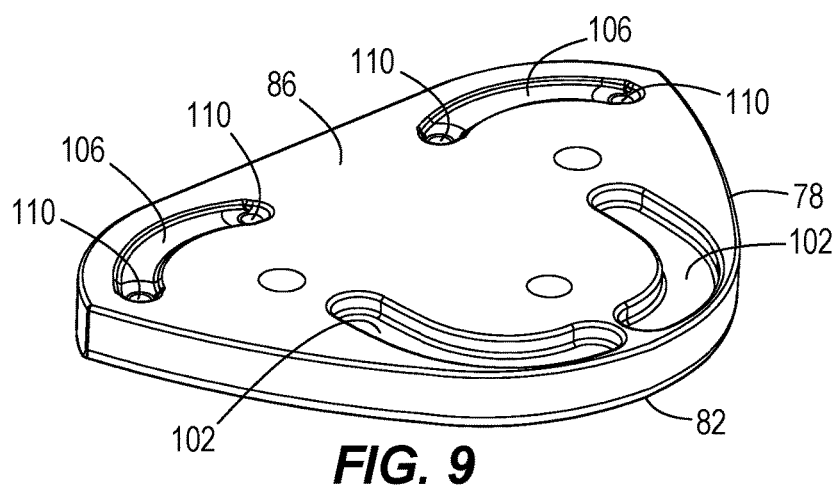
FIG. 9 is a perspective view of an interface plate of the battery pack of FIG. 1.

With reference to FIGS. 7 and 8, the outer housing 42 further includes an interface plate 78. The interface plate 78 is generally planar and has an exterior face 82 and an opposite interior face 86 (FIG. 9). FIGS. 7A and 8A illustrate the battery pack 10 with the interface plate 78 removed to show a lower portion 90 of the primary cell casing 14a. The lower portion 90 is located adjacent the bottom end 38 of the battery pack 10, as illustrated in FIG. 2. As shown in FIGS. 7A and 8A, the lower portion 90 includes a pair of arcuate recesses 94 which each have first and second ends 94a, 94b. A pair of latches 98 are secured to the first ends 66a of the connecting portions 58. The latches 98 are movable within the arcuate recesses 94 between the first and second ends 94a, 94b. As illustrated in FIG. 7A, when the latches 98 are adjacent the first ends 94a of the recesses 94, the battery pack 10 is in the closed position. Conversely, as illustrated in FIG. 8A, when the latches 98 are adjacent the second ends 94b of the recesses 94, the battery pack 10 is in the open position. The latches 98 are movable independent of each other such that the auxiliary cell casings 14b, 14c are movable independent of each other.

FIG. 9 illustrates the interior face 86 of the interface plate 78. The interface plate 78 includes a pair of arcuate recesses 102 defined in the interior face 86, which correspond with the arcuate recesses 94 of the lower portion 90 to receive the latches 98. The latches 98 are supported by both the recesses 94 and the recesses 102 to aid in distributing forces received by the auxiliary cell casings 14b, 14c and to prevent twisting of the latches 98. The interior face 86 is further provided with a second pair of arcuate recesses 106 defined therein. The arcuate recesses 106 include depressions 110 at ends thereof. As illustrated in FIG. 2, the depressions 110 are configured to receive a mating feature 114. The mating feature 114 extends beyond a lower surface of the distal portions 62. The mating features 114 engage the depressions 110 to secure the auxiliary cell casings 14b, 14c in a desired open or closed position relative to the primary cell casing 14a.

With continued reference to FIGS. 7A and 8A, the battery pack 10 further includes pins 118 which rotatably secure the distal portions 62 to the primary portion 54. Other fasteners 122 secure the respective battery cells 18a-18c within the cell casings 14a-14c. The fasteners 122 screw into the cell casings 14a, 14b, 14c and function as locating features within the cell casings 14a, 14b, 14c to align the cell casings 14a, 14b, 14c relative to each other. The pins 118 permit rotation of the distal portions 62 relative to the primary portion 54. With the first ends 70a of the distal portions 62 coupled to the second end 66b of the connecting portions 58, the connecting portions 58 are free to translate along the arcuate recesses 94, 106, and the distal portions 62 also constrained by the pins 118. Accordingly, a sliding cam or compound hinge type mechanism is provided to permit opening and closing of the distal portions 62.

FIG. 10 illustrates the battery pack 10 in the closed position with the cells 18a-18c received within and shielded by the cell casings 14a-14c. FIG. 11 illustrates the battery pack 10 in the open position with the tip ends 70b visible from the exterior of the battery pack 10. As illustrated in FIGS. 11-14, a power path 126 connects the battery cells 18a-18c to a common printed circuit board 130. The printed circuit board 130 is located within the primary cell casing 14a adjacent the top end 34 of the battery pack 10. The printed circuit board 130 includes terminals 134 which provide connections to the battery pack 10. Locating features within the primary cell casing 14a (FIGS. 15, 16) are provided to locate the printed circuit board 130 at an appropriate position such that the terminals 134 are accessible.

Figure 13:
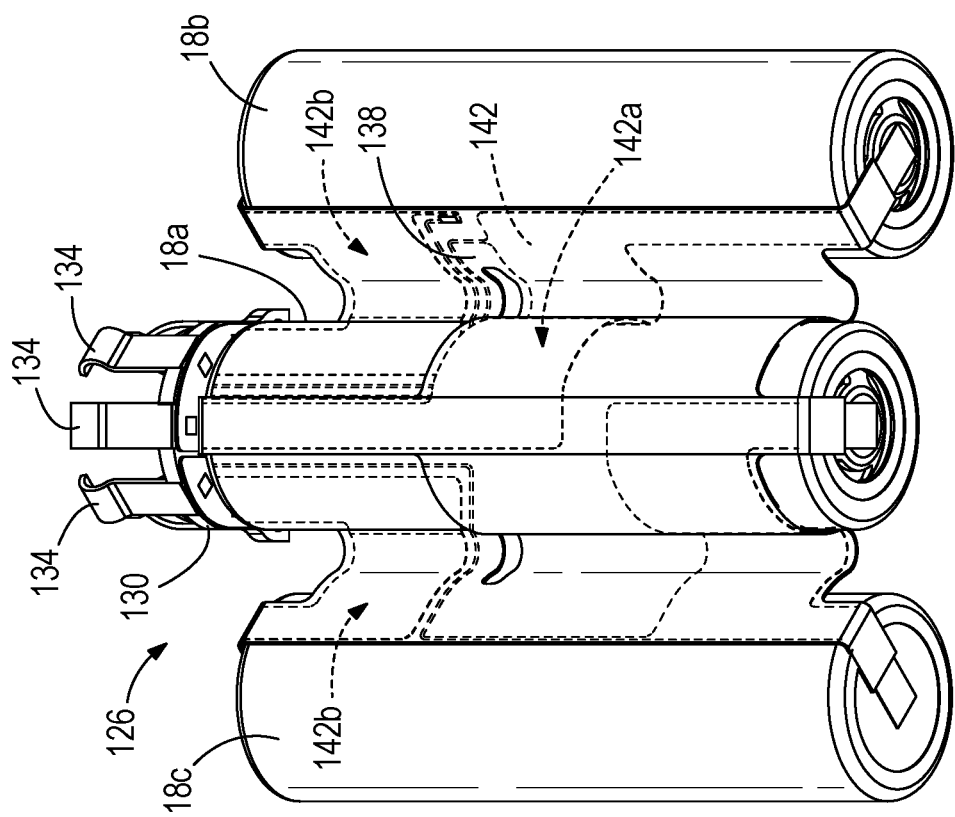
FIG. 13 is a bottom perspective view of the internal components of FIG. 12.
Figure 12:
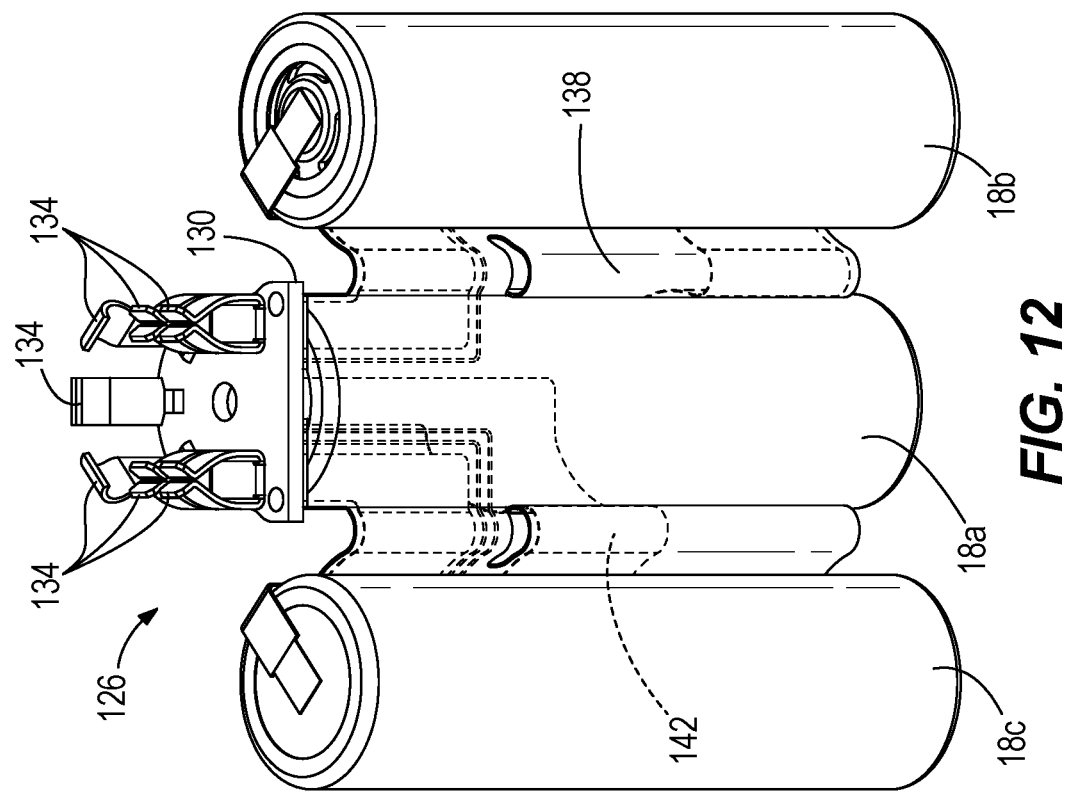
FIG. 12 is a top perspective view of internal components of the battery pack of FIG. 1 forming a power path.

As shown in FIGS. 12 and 13, the power path 126 is a flexible power path 126 operable to deform as the battery pack 10 transitions between the closed and open positions. The power path 126 includes a deformable protective layer 138 which shields a flexible circuit 142. The flexible circuit 142 itself is provided, in an exemplary embodiment, with 3 oz of copper conductive tracks. In other embodiments, the flexible circuit 142 is provided with 2-4 oz of copper conductive tracks. In other embodiments, the flexible circuit 142 is provided with 1-5 oz of copper conductive tracks. The amount and material selection of copper allow for high currents in the limited space of the battery pack 10. Other materials or amounts are possible. Similarly, the flexible circuit 142 of the illustrated embodiment is provided as a minimum 4 mm wide conductive track. In other embodiments, the flexible circuit 142 may be provided as with a minimum width conductive track of 3-5 mm. In other embodiments, the flexible circuit 142 may be provided as a conductive track or a plurality of conductive tracks having a combined minimum width of 2-6 mm. The width of the flexible circuit 142 maintains equivalent performance of known battery packs.

Figure 14:
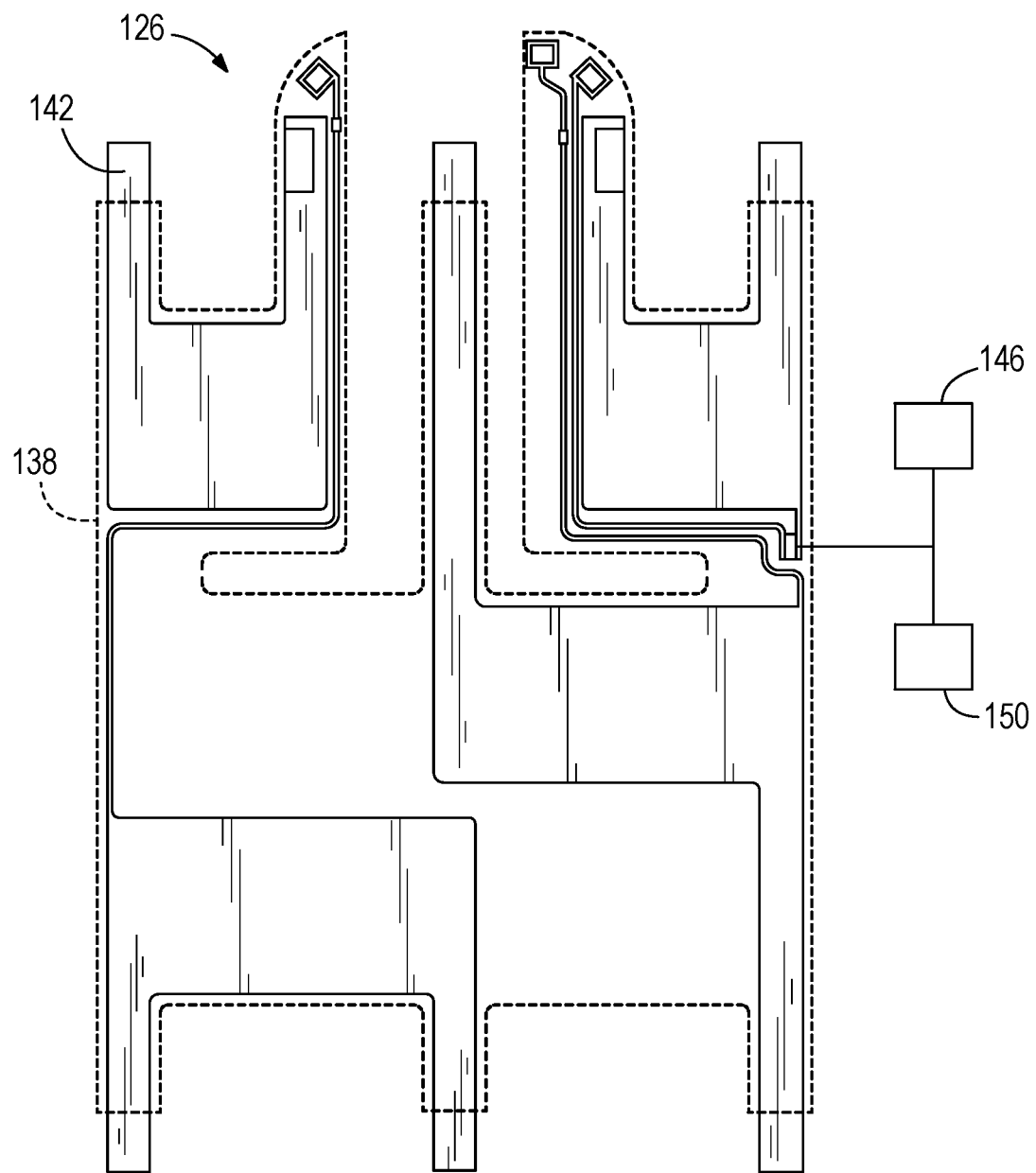
FIG. 14 is a rear view of the power path including a deformable protective layer and a flexible circuit of the foldable battery pack.

Connections between the flexible circuit 142 and the cells 18a-18c are made with, for instance, at least one of laser, ultrasonic, or resistance welding. Similarly, connections between the flexible circuit 142 and the terminals 134 may be made with, for instance, at least one of laser, ultrasonic, or resistance welding. Other electrical connection methods may be applicable. With reference to FIG. 13, the flexible circuit 142 includes a proximal portion 142a which is physically close to the battery cell 18a. The proximal portion 142a is generally fixed relative to the battery cell 18a. The flexible circuit 42 further includes a distal portion 142b which is movable relative to the proximal portion 142a and is closer to the battery cells 18b-18c than the proximal portion 142a. The proximal portion 142a and the distal portion 142b are closer to each other in the closed position (e.g., the first configuration) (FIGS. 1, 3) when compared to the open position (e.g., the second configuration) (FIGS. 2, 4). Turning now to FIG. 14, in some embodiments, the flexible circuit 142 is connected to a thermistor 146 capable of monitoring thermal properties (e.g., temperature) of the battery pack 10. In some embodiments, the flexible circuit 142 is connected to or includes resistors 150 operable as a voltage tap.

The protective layer 138 is sufficient to deform as the battery pack 10 transitions between the closed and the open positions while protecting the battery cells 18a-18c from damage. The protective layer 138 is collapsed when the battery pack is in the closed position (FIG. 1) and the protective layer 138 is expanded when the battery pack is in the open position (FIG. 2). The protective layer 138 may be made of a flexible wrap material for lithium-ion batteries such as FyreWrap® which is manufactured by Unifrax LLC. of Tonawanda, N.Y. The protective layer 138 may otherwise be made of Nomex, a commonly used flame-resistant meta-aramid polymer, or another material. Preferably, the protective layer 138 is flexible, resistant to high temperature, high in puncture resistance, and has electrically insulating properties. Other material properties may also promote successful protective layers 138.

Figure 16:
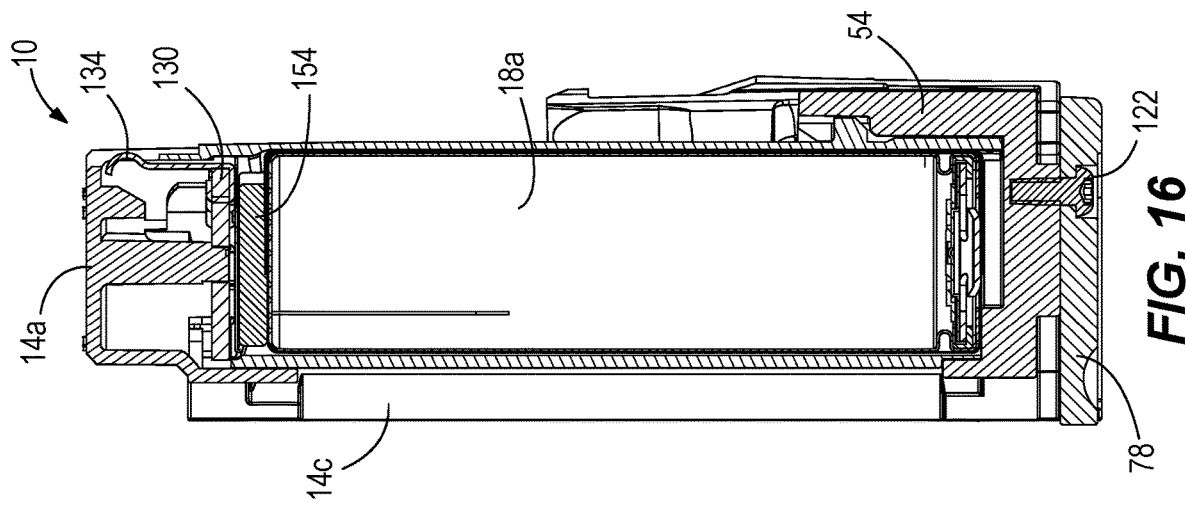
FIG. 16 is a cross-sectional view of the battery pack taken along section line 16-16 in FIG. 6 with the battery pack in the second configuration.
Figure 15:
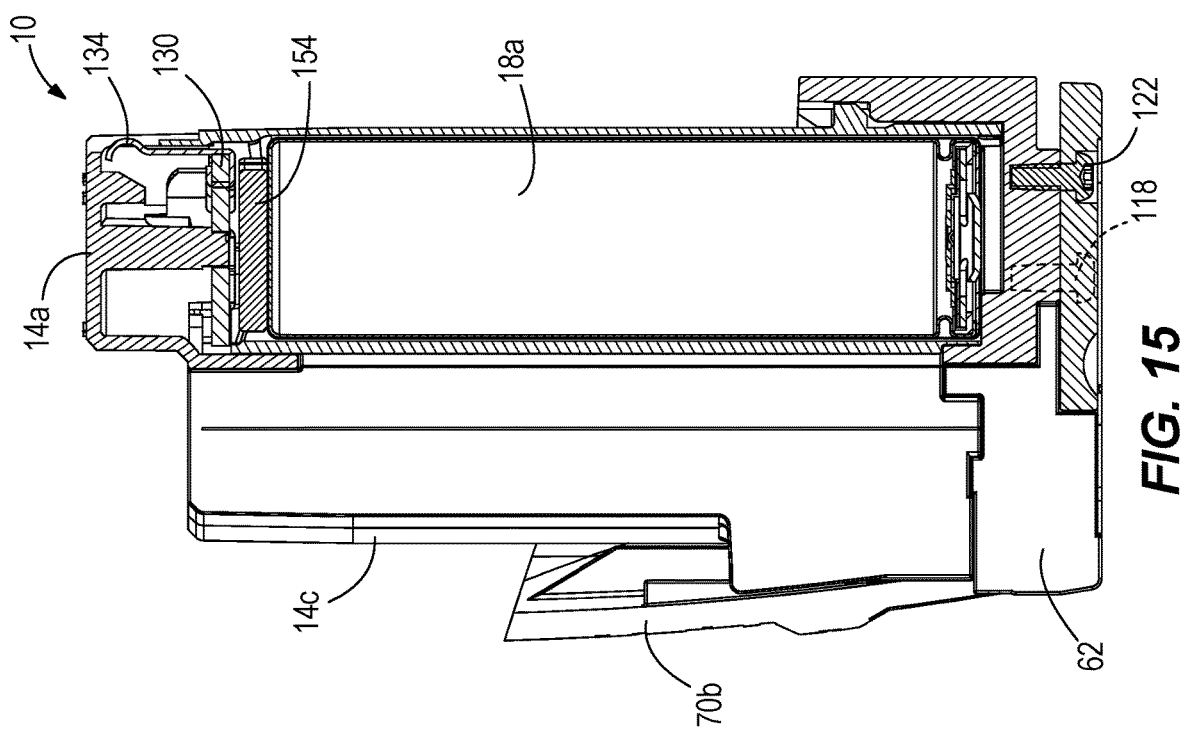
FIG. 15 is a cross-sectional view of the battery pack taken along section line 15-15 in FIG. 5 with the battery pack in the first configuration.

As illustrated in FIGS. 15 and 16, the battery pack 10 further includes a separator 154 mounted within the primary cell casing 14a between the printed circuit board 130 and the battery cell 18a to shield the printed circuit board 130 from the battery cell 18a and vice versa. The illustrated separator 154 is made of a material having outstanding thermal and electrical insulative properties. As such, electrical and thermal differences between the printed circuit board 130 and the battery cell 18a are mitigated by the separator 154. Other such separators 154 may be made of other materials to otherwise separate the printed circuit board 130 from the battery cell 18a. Separator 154 may be provided to shield the circuit board 130 from any of the battery cells 18a-18c.

FIG. 17 illustrates exemplary power tools and sensing devices 202-212 with which the battery pack 10 may be usable. The battery pack 10 may be usable with power tools such as a drill 202, a pipe cutter 204, an impact driver 206, and a reciprocating saw 208. The battery pack 38 may also be usable with non-motorized sensing devices such as a visual inspection camera 212, an infrared sensor 214 (such as a thermometer or thermal imaging camera), a clamp-type multimeter 216, and a wall scanner 218 (such as a "stud finder").

Figure 18:
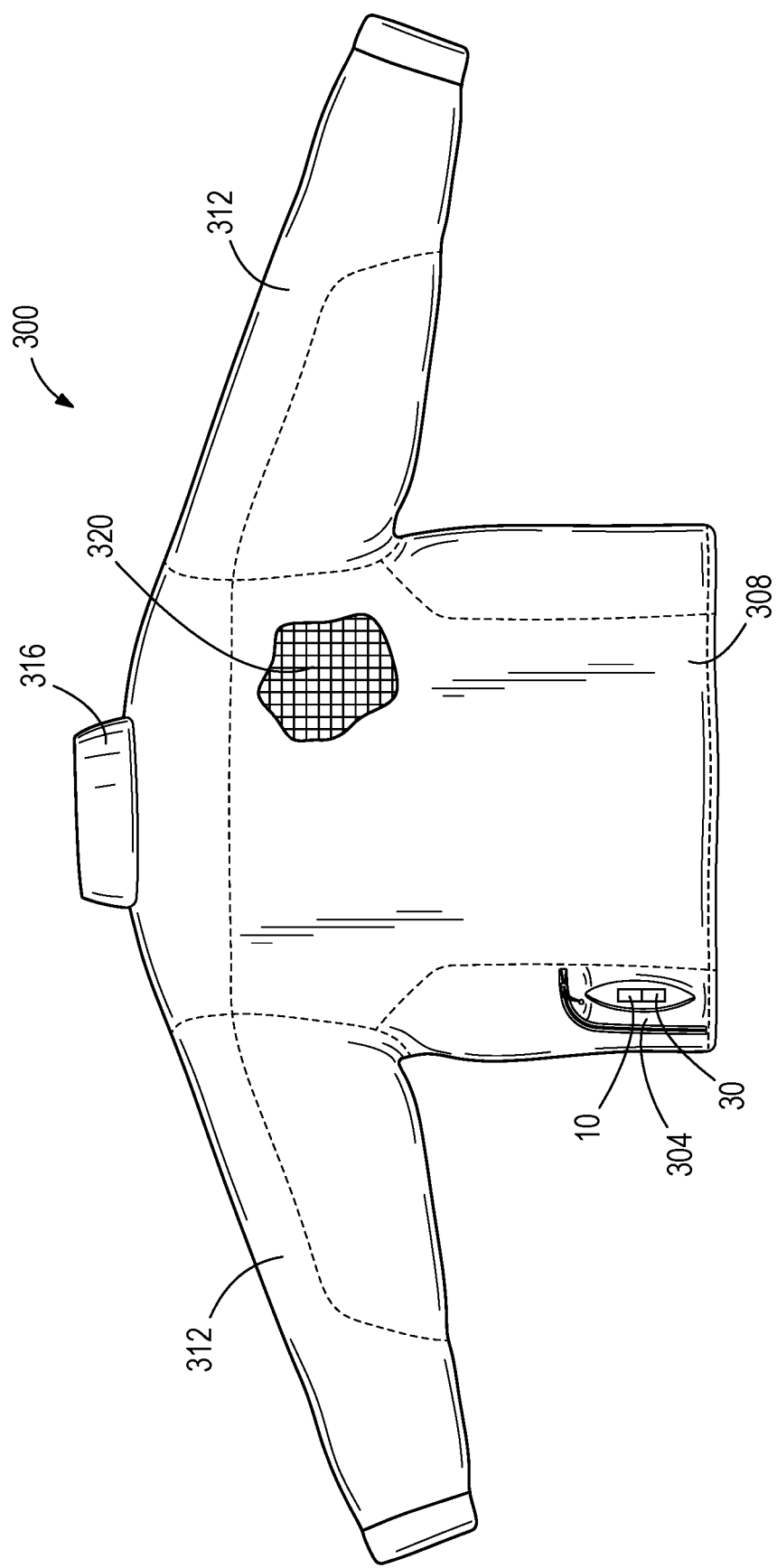
FIG. 18 is a rear view of the battery pack engaged with a heated jacket.

FIG. 18 illustrates a heated jacket 300 operable for use with the battery pack 10. As previously mentioned, the heated jacket 300 includes the compartment 304 within which the battery pack 10 and battery receptacle 30 are received. The compartment 304 is provided within a body portion 308 of the heated jacket 300. The heated jacket 300 further includes arm portions 312 and a neck portion 316 for covering the user. At least a portion of the body portion 308 is provided with a heater array 320 configured to convert chemical potential energy of the battery pack 10 to heat for heating the user. As previously mentioned, the battery pack 10 may be converted to the open configuration for use in the compartment 304 to limit discomfort of the battery pack 10 and battery receptacle 30 from chafing a user during use.

Although the invention has been described in detail with reference to certain preferred embodiments, variations and modifications exist within the scope and spirit of one or more independent aspects of the invention as described.

What is claimed is:

1. A battery pack comprising:
a first battery cell received at least partially within a primary cell casing and extending along a first axis,
a second battery cell received at least partially within an auxiliary cell casing extending along a second axis, the second battery cell movable relative to the first battery cell, and
an outer housing including a primary portion, a connector, and an auxiliary portion, and
wherein
the primary portion is fixed to the primary cell casing,
the connector includes a first connector end and an opposite second connector end, the first connector end coupled to the primary portion, the second connector end coupled to the auxiliary portion, and
the auxiliary portion includes a first auxiliary end and an opposite tip end, the first auxiliary end coupled to the second connector end.

2. The battery pack of claim 1, wherein the auxiliary cell casing is hingedly coupled to the primary cell casing.

3. The battery pack of claim 2, further comprising a piano hinge hingedly coupled to the primary cell casing and the auxiliary cell casing.

4. The battery pack of claim 1, wherein
the battery pack extends in a longitudinal direction extending perpendicular to the first axis,
the second battery cell is movable relative to the first battery cell such that the battery pack is convertible between a first configuration and a second configuration, and
the first axis and the second axis are offset along the longitudinal direction by a greater distance in the first configuration than in the second configuration.

5. The battery pack of claim 4, wherein
a lateral direction extends perpendicular to the first axis and perpendicular to the longitudinal direction, and
the first axis and the second axis are offset along the lateral direction by a lesser distance in the first configuration than in the second configuration.

6. The battery pack of claim 1, further comprising a plurality of second battery cells including the second battery cell, each of the plurality of second battery cells received at least partially within a respective auxiliary cell casing.

7. The battery pack of claim 6, wherein
each auxiliary cell casing has a corresponding auxiliary portion of the outer housing, each auxiliary portion includes a tip end, in a first configuration, the respective tip ends are located adjacent each other, and in a second configuration, the respective tip ends are spaced apart from each other.

8. The battery pack of claim 1, wherein the battery pack extends in a longitudinal direction extending perpendicular to the first axis, and in a first configuration of the battery pack, a length of the battery pack measured parallel to the longitudinal direction is between 50% and 75% less than in the second configuration.

9. A battery pack comprising:

a first battery cell received at least partially within a primary cell casing and extending along a first axis, at least one second battery cell received at least partially within at least one auxiliary cell casing extending along a second axis parallel to the first axis, a hinge rotatably coupling the primary cell casing to the auxiliary cell casing, such that the battery pack is convertible between a first configuration and a second configuration, a flexible circuit electrically coupling the first battery cell to the second battery cell, the flexible circuit including a first portion and a second portion, the first portion of the flexible circuit coupled to the first battery cell, the second portion of the flexible circuit coupled to the second battery cell, a printed circuit board, a separator mounted within the primary cell casing between the printed circuit board and the first battery cell, and wherein the flexible circuit electrically connects the printed circuit board to the first battery cell and the at least one second battery cell.

10. The battery pack of claim 9, wherein the first portion of the flexible circuit and the second portion of the flexible circuit are closer to each other in the first configuration than in the second configuration.

11. The battery pack of claim 9, further comprising a protective layer surrounding the flexible circuit.

12. The battery pack of claim 9, wherein the flexible circuit includes between 2 ounces and 4 ounces of conductive tracks having a width of between 3 millimeters and 5 millimeters.

13. The battery pack of claim 9, further comprising a thermistor electrically coupled to the flexible circuit.

14. The battery pack of claim 9, further comprising a voltage tap electrically coupled to the flexible circuit, the voltage tap comprising a plurality of resistors.

15. A battery pack comprising:

a first battery cell received at least partially within a primary cell casing and extending along a first axis, at least one second battery cell received at least partially within at least one auxiliary cell casing extending along a second axis parallel to the first axis, a hinge rotatably coupling the primary cell casing to the auxiliary cell casing, such that the battery pack is convertible between a first configuration and a second configuration, and an outer housing surrounding at least a portion of the primary cell casing and at least a portion of the auxiliary cell casing, the outer housing including a sliding cam assembly to move the outer housing between the first configuration and the second configuration.

16. The battery pack of claim 15, wherein the sliding cam assembly further comprises an interface plate including at least one arcuate recess defined therein and at least one latch slidably disposed within the at least one arcuate recess.

17. The battery pack of claim 16, wherein the sliding cam assembly further comprises a connector including a first connector end and a second connector end, the first connector end coupled to the latch the auxiliary cell casing rotatably coupled to the second connector end, and further comprising a pin rotatably coupling the auxiliary cell casing to the interface plate.

* * * * *